(12) United States Patent
Cheng

(10) Patent No.: US 6,641,262 B1
(45) Date of Patent: Nov. 4, 2003

(54) EYEGLASSES WITH DIAMOND-SHINING EFFECT

(76) Inventor: Chen-An Cheng, No. 33, Lane 340, Section 1, Hai Tien Road, Tainan (TW)

( * ) Notice: Subject to any disclaimer, the term of this patent is extended or adjusted under 35 U.S.C. 154(b) by 0 days.

(21) Appl. No.: 10/173,408

(22) Filed: Jun. 18, 2002

(51) Int. Cl.[7] ............................................... G02C 11/02
(52) U.S. Cl. ...................................................... 351/51
(58) Field of Search ...................... 351/51, 52; 63/1.11, 63/1.12, 1.16

(56) References Cited

U.S. PATENT DOCUMENTS

| | | | |
|---|---|---|---|
| 1,555,388 A | * | 9/1925 | Schumacher .................. 351/51 |
| 2,981,022 A | * | 4/1961 | Anger, Jr. ..................... 351/51 |
| 5,033,836 A | * | 7/1991 | Aoyama ....................... 351/51 |
| 6,226,232 B1 | * | 5/2001 | Ruchonnet ................... 368/223 |

FOREIGN PATENT DOCUMENTS

| | | | | |
|---|---|---|---|---|
| JP | | 6068318 | * 4/1985 | .................. 351/51 |

\* cited by examiner

Primary Examiner—Huy Mai
(74) Attorney, Agent, or Firm—Rosenberg, Klein & Lee

(57) ABSTRACT

A pair of eyeglasses in the present invention are provided with a plurality of spaced cavities in the surfaces of the eyeglass frame and both temples, and the surface of each cavity will produce the diamond-shining effect after being treated by vacuum gilding.

2 Claims, 3 Drawing Sheets

EYEGLASSES WITH DIAMOND-SHINING EFFECT

BACKGROUND OF THE INVENTION

1. Field of the Invention

This invention relates to a pair of eyeglasses with innovatory features, and more particularly, to a pair of eyeglasses that are provided with a plurality of spaced cavities in the surfaces of the eyeglass frame and both temples, and the surface of each cavity will produce the diamond-shining effect after being treated by vacuum gilding.

2. Description of the Related Art

There are more and more people who have poor eyesight and must wear eyeglasses to obtain better eyesight. Besides, most people like to do outdoor activities, and they must wear sunglasses to prevent strong sunrays from hurting their eyes. Many people whose eyes may be hurt by strong rays while working must wear industrial safety glasses to protect their eyes. Therefore, various kinds of eyeglasses are indispensable for modern people in daily life.

There are various styles of eyeglasses sold in market for the choices of different consumers. Among various styles of eyeglasses, the kind of eyeglasses with ornamental diamonds inlaid in the surface are most popular with young consumers because of the shining effect. Referring to FIG. 1, a pair of common conventional eyeglasses 30 with ornamental diamonds 31 are provided with a plurality of cavities 33 in predetermined positions of the eyeglass frame 32, and then ornamental diamonds 31 are glued and inlaid in the cavities 33. Although the above-referenced common eyeglasses 30 with ornamental diamonds 31 have the shining effect, the ornamental diamonds 31 may easily fall off from the cavities 33 because of bad assembly or by collision. Moreover, the material and assembly cost of ornamental diamonds 31 are very high, and the assembly process takes much time and labor.

SUMMARY OF THE INVENTION

Therefore, the objective of the present invention is to provide a pair of eyeglasses with diamond-shining effect that can substantially obviate the drawbacks of the related conventional eyeglasses.

An objective of the present invention is to provide a pair of eyeglasses that are provided with a plurality of spaced cavities in the surfaces of the eyeglass frame and both temples, and that the surface of each cavity will produce the diamond-shining effect by vacuum gilding.

Another objective of the present invention is to provide a pair of eyeglasses with diamond-shining effect that can save cost of material and time and labor for assembly.

Yet another objective of the present invention is to provide a pair of eyeglasses with diamond-shining effect that will not remain a cause of worry for a wearer that any ornamental diamond should fall off.

Accordingly, a pair of eyeglasses in the present invention are provided with a plurality of spaced cavities in the surfaces of the eyeglass frame and both temples, and the surface of each cavity will produce the diamond-shining effect after being treated by vacuum gilding.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
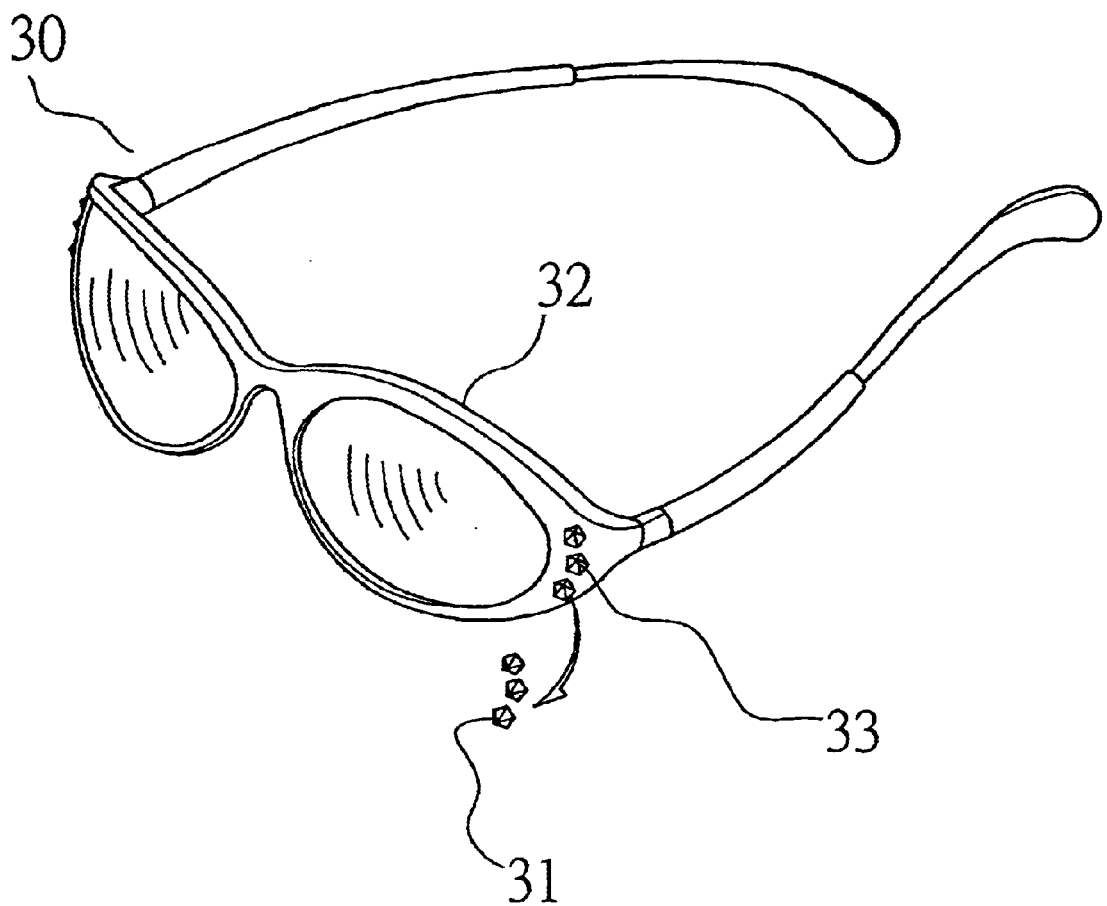
FIG. 1 is an exploded perspective view of a pair of conventional eyeglasses and ornamental diamonds.
Figure 2:
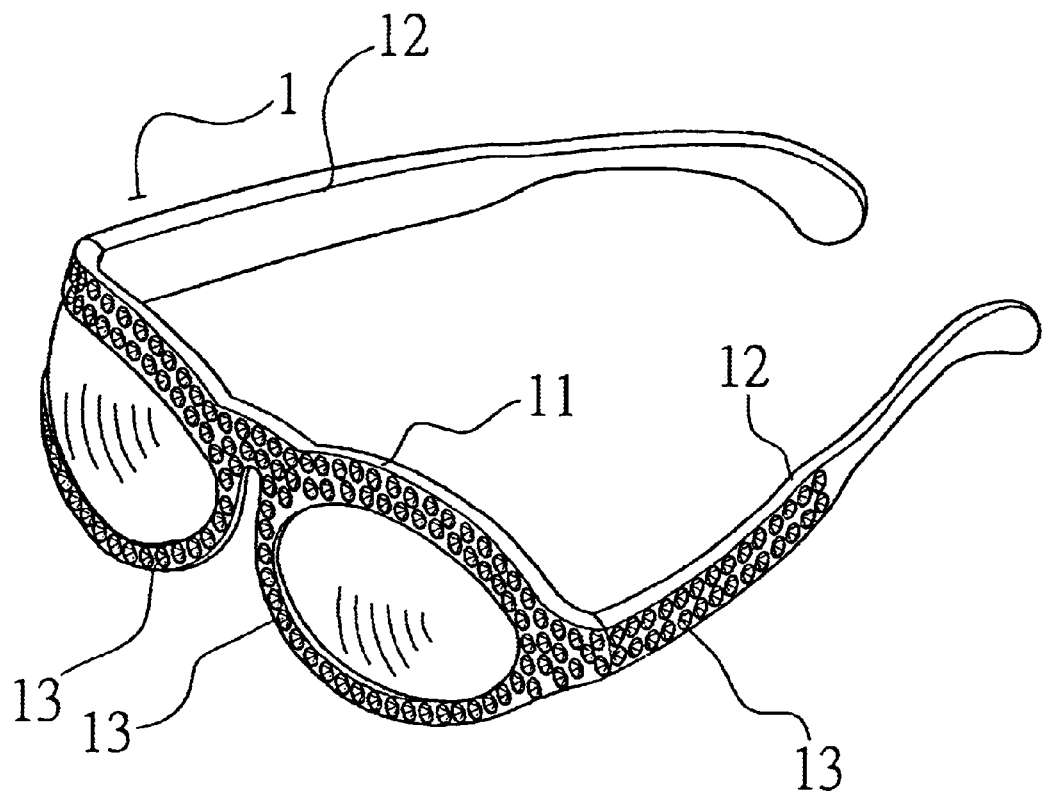
FIG. 2 is a perspective view of an embodiment of a pair of eyeglasses provided with conical cavities in accordance with the present invention.
Figure 3:
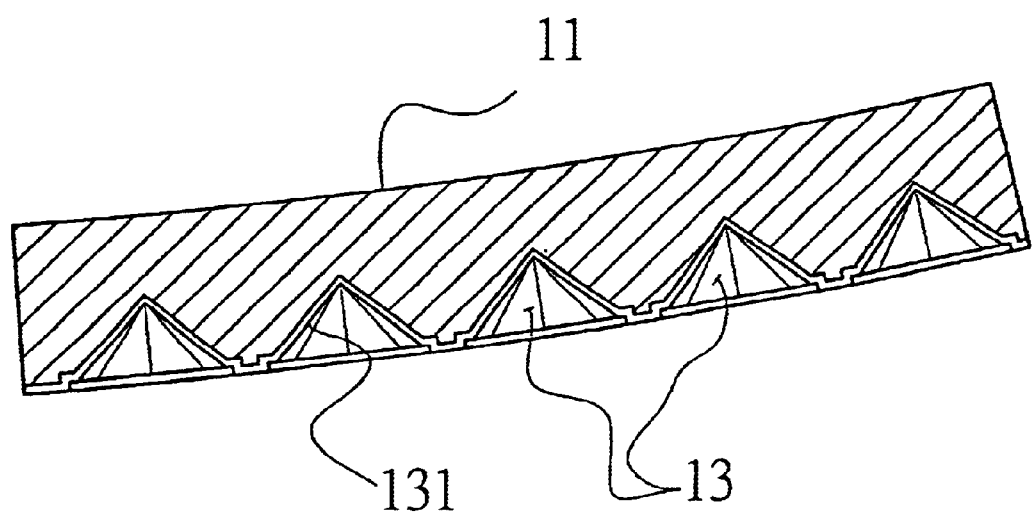
FIG. 3 is a cross sectional view of the conical cavities provided in the surface of the eyeglass frame in accordance with the present invention.
Figure 4:
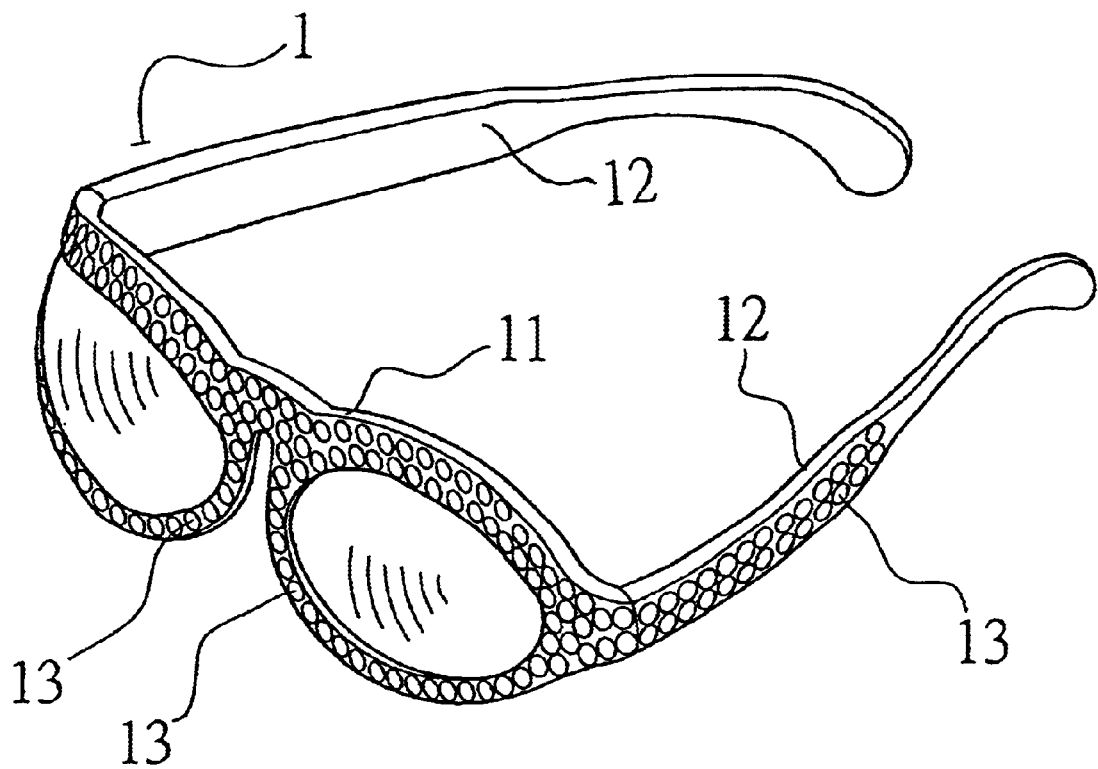
FIG. 4 is a perspective view of another embodiment of a pair of eyeglasses provided with semicircular cavities in accordance with the present invention; and, FIG. 5 is a cross sectional view of the semicircular cavities provided in the surface of the eyeglass frame in in accordance with the present invention.
Figure 5:
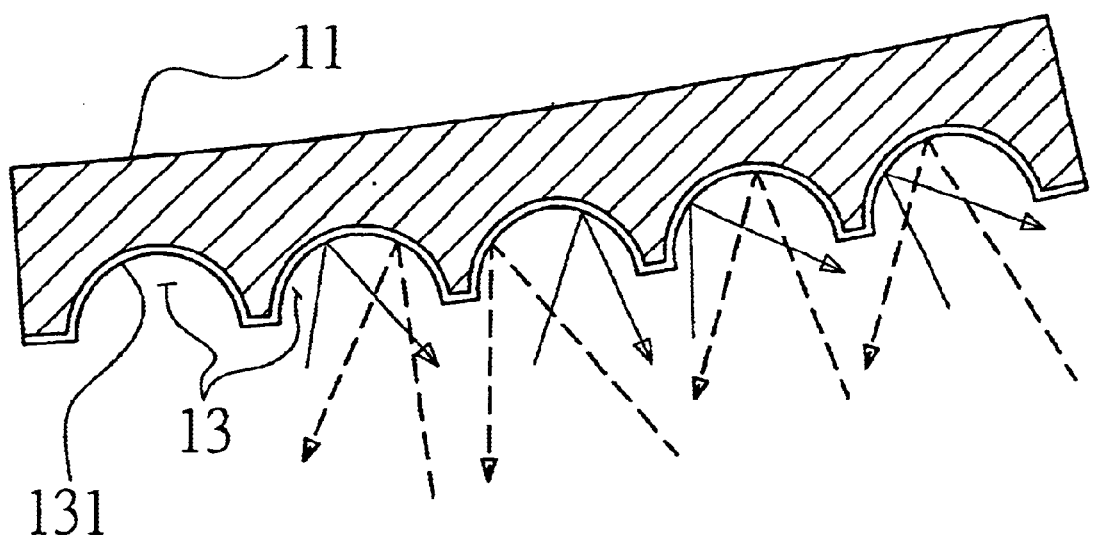

Referring to FIGS. 2 and 3, a pair of eyeglasses 1 in the present invention are provided with a plurality of spaced conical cavities 13 in the surfaces of the eyeglass frame 11 and both temples 12, and the inner surface of each cavity 13 is treated by vacuum gilding 131, so as for the pair of eyeglasses 1 to have the diamond-shining effect. Referring to FIGS. 4 and 5, the shape of each cavity 13 may alternatively be polygonal, semicircular, etc.

While the preferred embodiments of the invention have been described above, it will be recognized and understood that various modifications may be made therein, and the appended claims are intended to cover all such modifications which may fall within the spirit and scope of the invention.

What is claimed is:

1. A pair of eyeglasses with a diamond-shining effect comprising:

(a) an eyeglass frame that includes a pair of temples;

(b) a plurality of spaced open-ended cavities formed within at least a portion of in the surfaces of said eyeglass frame defining respective open-ended cavity surfaces; and, (c) a reflective coating layer formed on said open-ended cavity surfaces by vacuum gilding for enhancing light reflection from said spaced open-ended cavities.

2. The pair of eyeglasses as recited in claim 1, wherein each of said plurality of spaced open-ended cavities are formed as recesses having a cross-sectional contour chosen from the group consisting of polygons, circles and other closed contours.

* * * * *